2 Sheets—Sheet 1.
J. M. KEEN.
MACHINE FOR CUTTING, SCORING, AND CORNERING PAPER FOR BOXES.
No. 109,630. Patented Nov. 29, 1870.
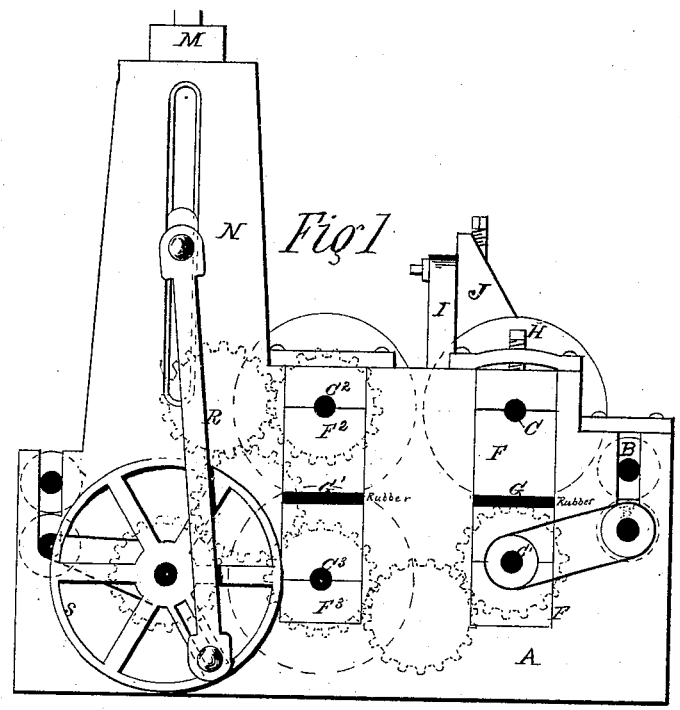
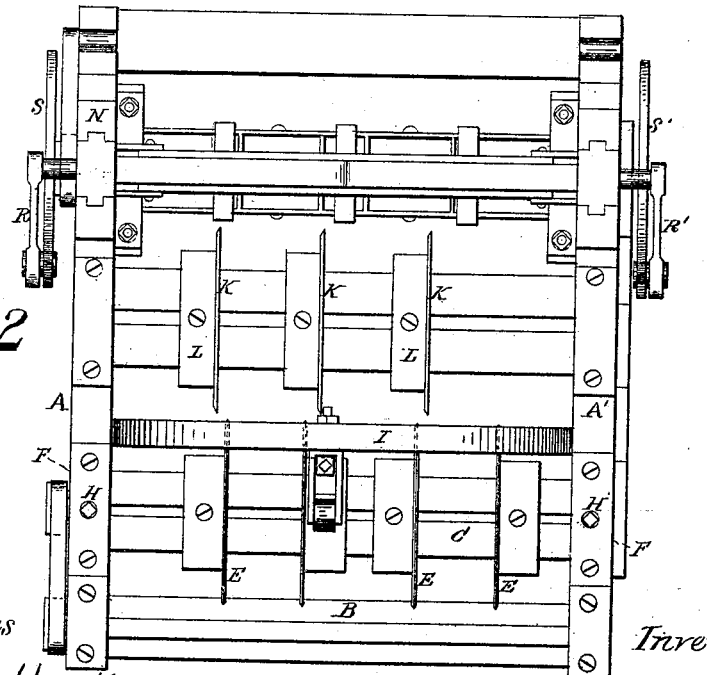
Witnesses
Inventor 2 Sheets—Sheet 2.
J. M. KEEN.
MACHINE FOR CUTTING, SCORING, AND CORNERING PAPER FOR BOXES.
No. 109,630. Patented Nov. 29, 1870.
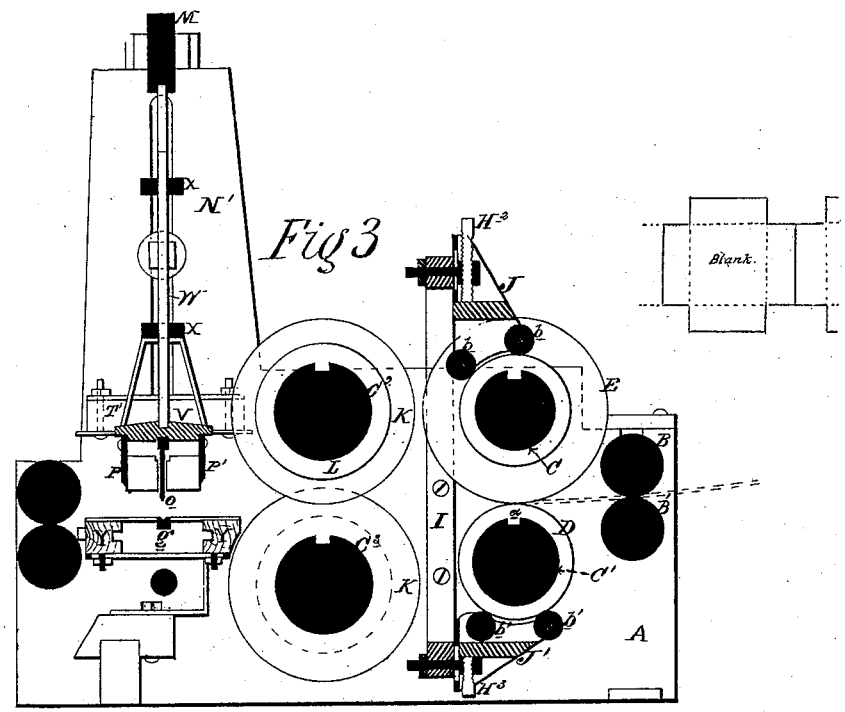
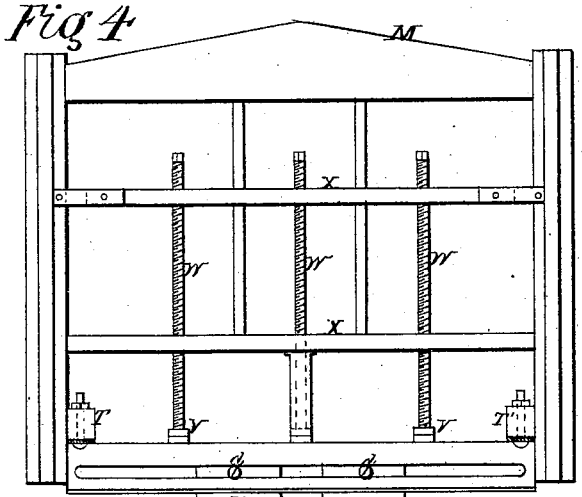
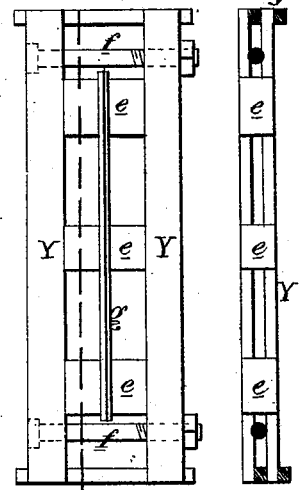
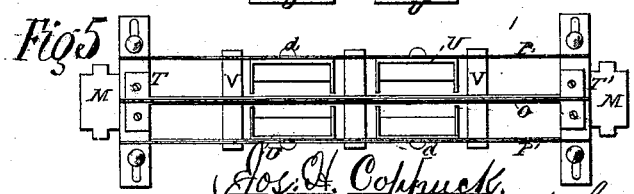

United States Patent Office.

JACOB M. KEEN, OF PHILADELPHIA, PENNSYLVANIA, ASSIGNOR TO HIMSELF AND CHARLES C. G. ARMELING, OF SAME PLACE.

Letters Patent No. 109,630, dated November 29, 1870.

---

IMPROVEMENT IN MACHINES FOR CUTTING, SCORING, AND CORNERING PAPER FOR BOXES.

---

The Schedule referred to in these Letters Patent and making part of the same.

---

I, JACOB M. KEEN, of the city and county of Philadelphia, and State of Pennsylvania, have invented a new and "improved Machine for Scoring, Cutting, Cornering, and Blocking off Material for Paper-Boxes, of which the following is a specification.

The object of my invention is to combine in one machine all the features that are necessary for preparing pasteboard for making paper-boxes—that is, scoring, cutting, cornering, and blocking off the material at one operation, thus leaving it in a proper state to be folded and pasted together, to form a complete box.

The machine consists of a series of rotary scoring and cutting-knives, mounted on shafts which work in appropriate bearings formed in the frames of the machine. The scoring-knives make a longitudinal line of sufficient depth (at a certain distance apart, according to the width of box required) to allow the material to be turned up to form the sides of the box, while the cutting-knives are adjusted so as to cut the material for the proper height of the box.

At the back part of the machine, and extending across the same, is arranged a vertically-moving frame, carrying with it a cutting and two scoring-knives, which cut the material of the proper length, and scores it across for the ends of each box, at the same time a series of rectangular-shaped knives, attached to and moving with the frame, removes square pieces from the corners.

The invention is fully illustrated in the accompanying drawing, in which—

Figure 1 is a side elevation of the machine.

Figure 2 is a plan of same.

Figure 3 is a vertical transverse section through the center of the machine.

Figure 4 is a detached and vertical view of the sliding frame with its scoring and cutting-knives.

Figure 5 is a bottom plan of same.

Figure 6 is a plan view of the bed on which the knives operate for cutting the corners of the material.

Figure 7 is a sectional view of the same on the line $a\ b$.

At the front part of the frames A and A' of the machine are placed two rollers or calenders, B and B', the journals of which turn in slots formed in the frames.

Immediately back of these rollers are placed two shafts, C and $C^1$; one raised above the other, the lower one, $C^1$, being provided with a series of adjustable collars, D, fig. 3, the set-screw for securing them in position fit in a slot, $a$, made in a longitudinal direction on the face of the shaft.

The upper shaft, C, is provided with a series of scoring-knives, E, which are made circular in form, and are adjusted on the shaft, similar to the collars D, with their outer circumferences in contact with the same. The knives do not cut entirely through the material, but merely score it, of sufficient depth to form a pliable joint, and allow the paper to be turned up to form the sides of the box, their edges, for this purpose, being made slightly tapering.

The boxes F F, in which the journals or the shaft C and $C^1$ revolve, are fitted in rectangular-shaped recesses made in the frames A and A' of the machine, and between each of the upper and lower boxes is placed a rubber spring, G, which forms a yielding bed for the shaft C. The boxes, carrying with them the shaft C, are depressed by means of the set-screws H H, which causes the knives E to bear on the material, and to score it to a greater or less depth, as required.

Secured to the inner sides of the frames A and A', at a short distance back of the shafts C and $C^1$, is a bow-shaped frame, I which projects a certain height above the frames, and curves down to within a short distance of the bottom of the same, and acts in the capacity of a brace, to resist the vibrations of the operating parts, and, at the same time, serve as a support for two brackets, J and J', carrying two friction-rollers, $b\ b$ and $b'\ b'$.

These brackets give additional stiffness to the shafts, and prevent any undue bending or twisting of them. The rollers on the bracket J' revolve in close contact with one of the collars D, while those on the bracket J are kept in contact with one of the collars on the upper shaft $C^1$.

The brackets are attached to the frame I by means of bolts (fig. 3,) passing through slots formed in it, thus allowing them to be moved sideways, in conformity with the collars.

They are also supplied with set-crews, $H^2$ and $H^3$, for raising and depressing them.

The knives K K, for cutting the paper, are secured to collar L L, which are placed over and are adjusted on the shafts $C^2$ and $C^3$, similar to those on shaft C and $C^1$, the cutting-edges of the said knives lap over and work close together in the same manner as a pair of shears, and cut the material of the proper width after it leaves the scoring-knives.

The shafts $C^2$ and $C^3$ are made with an increased diameter, in order to give additional strength to them, and are arranged in the frames A and A' similar to the shafts C and $C^1$, with a gum spring, G', placed between the boxes $F^2$ and $F^3$.

This portion of the machine, arranged as above described, is for scoring the material in a longitudinal direction, for the sides of the box, and for cutting it of the proper width and height, after which it passes to that portion of the machine hereinafter described, when, by a reciprocating movement of the scoring and cutting-knives, the material is marked off for the ends of the box, cut of the proper length, and the corners removed.

The frame M, (figs. 4 and 5,) which has a vertical movement in the standards N and N' at the rear portion of the machine, is supplied, at the lower part, with a cutting-knife O, and two scoring-knives, P and P', and receives its motion from the side rods R and R', (fig. 2,) the lower ends of which are connected to two wheels, S and S', the attachment being made by two crank-pins, which are fitted in slots formed in one of the arms of each wheel.

The cutting-knife O (figs. 3 and 5) has its ends fastened securely to two cross-pieces, T and T', bolted to the inner side of the upright of the frame, and on each side of it are placed the scoring-knives P and P'. These are also secured to the under side of the cross-pieces by means of plates, provided with slots and set-screws, thus allowing them to be moved closer together or separated.

The rectangular-shaped knives U U, which cut the corner openings of the boxes, are attached to the inner sides of the scoring-knives by means of screws $d$ $d$, passed through slots formed longitudinal through the blade of same.

The score-knives have resting on their upper edges, and at a certain distance apart a series of head-blocks, V V, which are depressed, when it is desired that the knives should score a line of increased depth, by means of the screw-rods W W, which pass through the cross-braces X X of the frame. This arrangement also gives additional stiffness, and prevents the knives from springing.

The bed-frame, (figs. 6 and 7,) which is placed directly under the frame M, is composed of two longitudinal pieces Y Y, provided with grooves on the inner side, in which are inserted transverse pieces $e$ $e$ $e$, the whole being securely held together by means of bolts $f$ $f$.

In the center of the bed-frames is secured a wooden strip, $g$, provided with a groove on the upper surface for the reception of the cutting-edge of the knife O.

The transverse pieces $e$ $e$ $e$ of the bed-frame may be moved in a longitudinal direction in the grooves of the pieces Y Y in order to increase or diminish the distance between them, to accommodate different sizes of boxes; or they may be removed and shorter ones substituted, and the pieces Y and Y drawn closer together by the rods $f$ $f$.

The ends of the pieces Y and Y are fitted into guides formed on the inner side of the frames A and A', and the under side of the bed-frame is provided with gauges, $h$ $h$, for regulating and holding it in position when adjusted.

The slots formed in the wheels S and S' for the reception of the crank-pins of the side rods R and R', permit of any length of stroke being given to the frame M, in order to produce a fast or slow motion of it, thus causing the knife O, in operating on the material, to cut it of any length required for the box.

The pasteboard selected for the boxes is passed between the rollers B and B', (fig. 3,) and in passing under the scoring-knives E it receives a series of parallel score-marks in a longitudinal direction, (the knives having previously been set to suit the width of box required,) after which it is projected under the cutting-knife K, which cuts the material at a certain distance from the score-marks, to form, when turned up at right angles, the sides of the box.

The material having been cut into strips of the proper width, and being still in motion, is carried toward the bed Y Y, under the frame M, and, on reaching the cutting-knife O, which descends at the proper moment, the ends are cut square and even, at the same time the scoring-knife P' has marked each piece transversely, to form the ends of the box, while the rectangular-shaped knives U U have passed down into the spaces between the pieces $e$ $e$ $e$ of the bed and removed square pieces from the material for the corner openings of the box.

The frame M is adjusted so that, by the time it has made a complete stroke, the material has passed under a sufficient distance for the length of the box, when the knife O cuts it, and the knife P scores it across for the opposite ends of the box, while the adjacent knives, U U, remove square pieces for the corners.

The lids or covers of the boxes are formed in the same manner, the cutting-knives being adjusted to cut the material of a proper size for the depth.

I claim as my invention—

1. The frame M, arranged in the uprights N and N', and provided with a cutting-knife O, scoring-knives P and P', rectangular-shaped knives U U, cross-pieces T and T', head-blocks V V, and screw-rods W W, all combined and operating in the manner and for the purpose herein specified.

2. The construction of the longitudinal pieces Y Y, cross-pieces $e$ $e$ $e$, bolts $f$ $f$, and wooden strip $g$, arranged between the frames A and A' of the machine, in the manner and for the purpose set forth.

JACOB M. KEEN.

Witnesses:
  Jos. H. COPPUCK,
  CHARLES H. EVANS.